US009614730B2

(12) United States Patent
Boshev et al.

(10) Patent No.: US 9,614,730 B2
(45) Date of Patent: Apr. 4, 2017

(54) PERFORMING CUSTOMIZED DEPLOYMENT SCENARIOS IN SHARED ENVIRONMENTS

(71) Applicants: Stoyan Boshev, Sofia (BG); Shenol Yousouf, Sofia (BG)

(72) Inventors: Stoyan Boshev, Sofia (BG); Shenol Yousouf, Sofia (BG)

(73) Assignee: SAP SE, Walldorf (DE)

( * ) Notice: Subject to any disclaimer, the term of this patent is extended or adjusted under 35 U.S.C. 154(b) by 512 days.

(21) Appl. No.: 14/068,269

(22) Filed: Oct. 31, 2013

(65) Prior Publication Data

US 2015/0121155 A1     Apr. 30, 2015

(51) Int. Cl.
G06F 9/445 (2006.01)
H04L 12/24 (2006.01)
H04L 29/08 (2006.01)
H04L 29/06 (2006.01)

(52) U.S. Cl.
CPC .......... *H04L 41/0893* (2013.01); *H04L 63/20* (2013.01); *H04L 67/10* (2013.01); *H04L 67/16* (2013.01); *H04L 41/0863* (2013.01)

(58) Field of Classification Search
None
See application file for complete search history.

(56) References Cited

U.S. PATENT DOCUMENTS

| | | | |
|---|---|---|---|
| 7,562,341 B2 | 7/2009 | Kovachka-Dimitrova et al. | |
| 7,711,607 B2 | 5/2010 | Agassi et al. | |
| 7,735,097 B2 | 6/2010 | Kovachka-Dimitrova et al. | |
| 7,747,698 B2 | 6/2010 | Kovachka-Dimitrova et al. | |
| 8,024,746 B2 | 9/2011 | Eberhard | |
| 2008/0172736 A1* | 7/2008 | Barr | G06F 8/61 726/20 |
| 2009/0228879 A1 | 9/2009 | Blohm et al. | |
| 2010/0235829 A1* | 9/2010 | Shukla | H04L 67/34 717/177 |
| 2011/0307780 A1 | 12/2011 | Harris et al. | |
| 2011/0321037 A1* | 12/2011 | Jimenez-Salgado | G06F 8/60 717/178 |
| 2012/0102109 A1 | 4/2012 | Eberhard | |
| 2013/0159984 A1 | 6/2013 | Misovski et al. | |
| 2013/0232497 A1* | 9/2013 | Jalagam et al. | 718/104 |
| 2013/0254755 A1 | 9/2013 | Yousouf et al. | |
| 2013/0275623 A1 | 10/2013 | Stoilov et al. | |
| 2013/0275958 A1 | 10/2013 | Ivanov et al. | |
| 2013/0326487 A1 | 12/2013 | Yousouf et al. | |
| 2013/0346945 A1 | 12/2013 | Yousouf et al. | |
| 2014/0259010 A1* | 9/2014 | Gala | G06F 8/63 717/177 |

\* cited by examiner

*Primary Examiner* — Timothy Duncan (57) ABSTRACT

Various embodiments of systems and methods to process customized deployment scenarios in a shared computing environment are described. In one aspect, a deployment request is received at the shared computing environment by a client associated with a customized deployment scenario. In a response, a deploy service of the shared computing environment is instantiated. In another aspect, one or more custom deploy processors are identified by the deploy service, where the one or more custom deploy processors correspond to one or more customized deployment scenarios. In yet another aspect, a part of a deployable content passed to the one or more custom deploy processors by the deploy service, is deployed to the shared computing environment by at least one corresponding custom deploy processor.

21 Claims, 6 Drawing Sheets

PERFORMING CUSTOMIZED DEPLOYMENT SCENARIOS IN SHARED ENVIRONMENTS

BACKGROUND

Cloud-based computer services represent a rapidly growing market in current information technology industry. One of the factors for providing a successful cloud platform is the flexibility to deploy a broad range of applications for different clients. Often, to deploy different applications on a cloud-based platform means meeting different requirements or deployment scenarios for processing the deployable content. There may be differences regarding the runtime specifics for the different applications to be executed, the data they need to be uploaded and available on the platform, the applied security constraints, etc. Whenever a new application requires specific or customized deployment process, a deploy service of the cloud-based application platform needs to be modified, which may require substantial resources in both work power and time. On the other hand, the integration of the specific requirements into the existing deploy processes is prone to errors. Additionally, the provider of the cloud-based application platform is not able to serve the client's customized deployment scenario while the deploy service is not updated, accordingly.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to provision customized deployment scenarios in shared computer environments are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
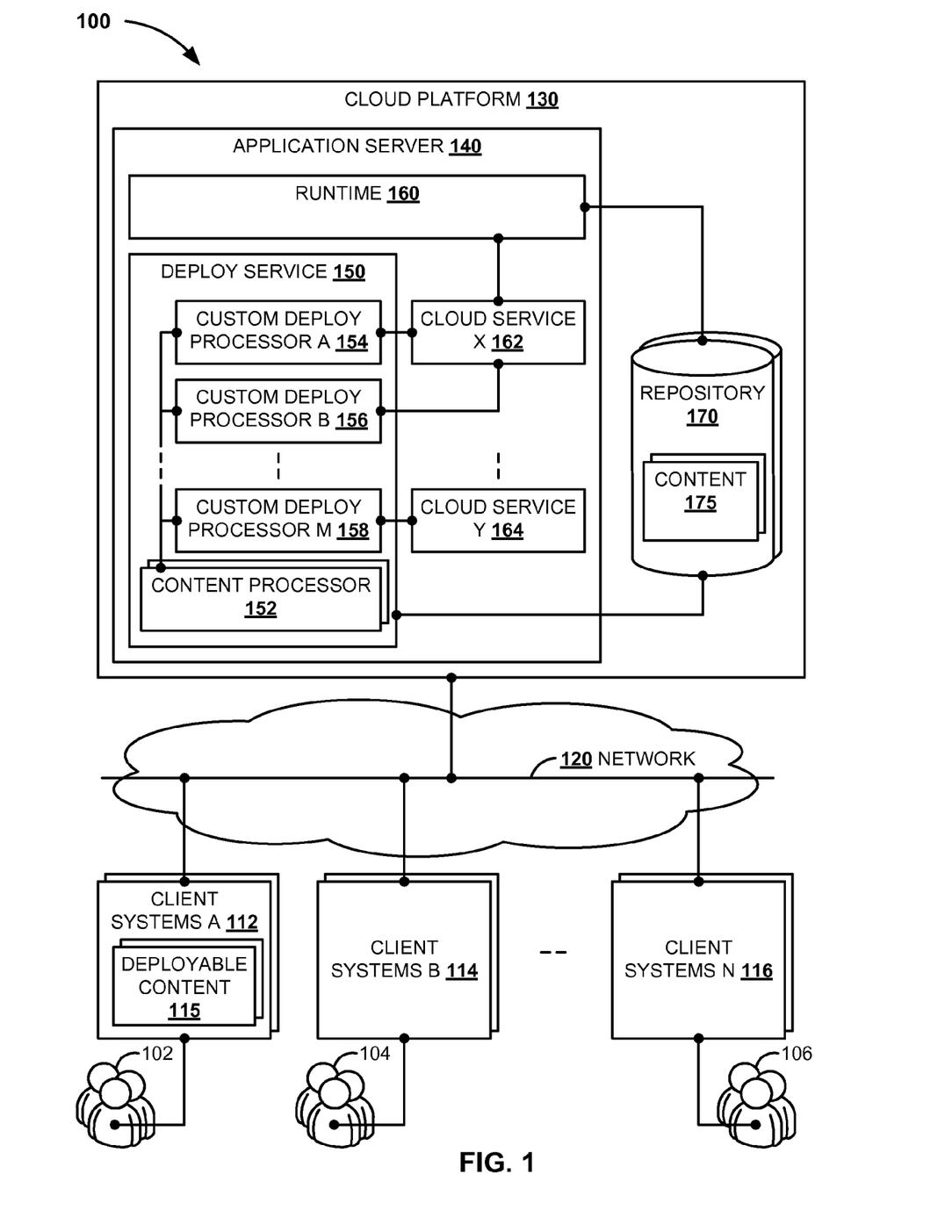
FIG. 1 is a block diagram illustrating a shared computer environment, provisioning customized deployment scenarios, according to one embodiment.

FIG. 1 illustrates shared computer environment 100 provisioning customized deployment scenarios, according to one embodiment. Cloud computing is one popular example for shared or distributed computer environment. Hence, the modules included in environment 100 may refer to cloud-based solutions. However, embodiments based on other types of shared computer environments may exist, including similar modules and applying similar concepts. In the shared, e.g., cloud-based, computer environment 100, a number of clients may provide various services to their customers at cloud platform 130 over network 120, e.g., the Internet. The different clients of the cloud platform may deploy and/or request a variety of applications or services to be available for their respective customers, e.g., customers 102, customers 104, customers 106. The customers of each of the clients of the cloud platform 130 may access the provided services using different client systems, e.g., client systems A 112, client systems B 114, client systems N 116. Generally, any type of computer system could be used in the presented shared environment 100, including desktop computers, mobile devices, even other shared computer environments, etc.

In one embodiment, deploy service 150 may provide a common interface allowing plugging-in a number of custom deploy processors (e.g., custom deploy processor A 154, custom deploy processor B 156 and custom deploy processor M 158) to address specific deployment needs of the clients. Thus, when a new request for customized deployment scenario is received, instead of modifying the deploy service 150, an additional custom deploy processor may be developed and introduced in the cloud platform 130.

For example, a user of client 102 may request deployment of content 115 at application server 140 of cloud platform 130 by following a specific or customized scenario. In one embodiment, one or more custom deploy processor plugins may be separately developed to handle the specifics of the customized deployment scenario for the content 115. When the deployment of the deployable content 115 is initiated (e.g., by a user of users 102 at client systems A 112), the deploy service 150 may pass the artifacts of the deployable content to a corresponding content processor 152, e.g., based on their type. If necessary, the content processor 152 validates and transforms the deployable content artifacts, and stores them as content 175 of the application server 140 at cloud platform repository 170. Generally, the cloud platform repository 170 may be used to store different kinds of data related to the cloud infrastructure or the application server 140, and respectively the applications running on the application server 140, including service cloud service X 162 and cloud service Y 164.

In one embodiment, the content processor 152 calls the plugged-in custom deploy processors (154-158) to perform the deployment of the artifacts. The deployable content 115 may include artifacts pertinent to specific application or applications (e.g., service cloud service X 162 and/or cloud service Y 164) that require customized deployment. The deploy service 150 passes the deployable content artifacts to the custom deploy processors (154-158) through content processor 152. Each of the custom deploy processors recognizes its corresponding artifacts, if any, and process them according to the customized deployment scenario, and uploads data (e.g., content 175) or configuration information as requested by the client.

Deploy service 150 can plugin custom deploy processors (154-158) to lookup corresponding artifacts in the deployable content 115. One custom deploy processor may search for one type of content, another for different type of content. When corresponding content is found, a custom deploy processor may open it, read it, parse it and store it in a predefined place, e.g., in the repository 170 (content 175). Additionally, a custom deploy processor may generate a notification (through exception), if there is an error during the deploy process, e.g., if the custom deploy processor decides that the corresponding content is incorrect, or cannot parse it correctly. In case of exception during the deployment, the whole deploy process may be terminated and canceled. The content deployed during the customized scenario (e.g., content 170) may be removed by the same corresponding content deploy processors.

From implementation perspective, the deploy service 150 and the custom deploy processors (e.g., 154-158) follow a predefined contract or interface. Such contract may encompass a list of rules, for example defining call methods, parameters, handling of exceptions, etc. Thus, the functionality of the deploy service 150 may be flexibly enhanced by plugging-in contract compliant custom deploy processors, without changing the deploy service itself. The contract may by defined by a specific Application Programming Interface (API) implemented by the custom deploy processors. Each custom deploy processor may need to register when instantiated to be discoverable by the deploy service, or by the relevant content processor.

In one embodiment, same deployable content (e.g., 115) may be processed by the deploy service 150 and one or more custom deploy processors (154-156), where the deploy service and the custom deploy processors separately process the content, or corresponding parts of the content, as defined. For example, one of the custom deploy processors may write part of the content in the repository 170; another of the custom deploy processors may write the same part of the content (or elements of it) in a file system of the application server 140; a third of the custom deploy processors may use that part the content for processing another part of the content; etc. Thus, different types of the same deployable content may be handled by different custom deploy processors. For example, a deployable content provided as a Web application Archive (WAR) file could be processed by a number of custom deploy processor plugins of the deploy service, where one may extract and deploy definitions of security roles, another may extract properties for instrumenting or setup the Web application during runtime, etc.

In one aspect, the deployable content may store metadata, such as deployment descriptors (DD), annotations, etc., pointing out to corresponding custom deploy processor. In another aspect, a custom deploy processor may recognize pertinent deployable content based on predefined marks. For example, the security roles are usually described in a special eXtensible Markup Language (XML) file in the deployable content (WAR file); policy files allowing or enabling encryption of application data may be placed in a specific structure (folder) of the WAR file. Thus, if a corresponding custom deploy processor detects such XML file, or a file in a specific structure of the deployable content, applies the customized deploy operations as programmed.

The company SAP AG is one of the vendors of cloud platforms based on Java®, called Java Platform-as-a-Service (jPaaS), compliant with the "Open Service Gateway Initiative" (OSGi) standard, that is deploying content provided as WAR files. A user may request the deployment of new or updated content to the cloud platform, e.g., by using Integrated Development Environment (IDE) tool provided by SAP AG or by using Call Level Interface (CLI), The deployable content may be of different type, including WAR files, OSGi bundles, "P2" update sites ("P2" is a component of Equinox project, and provides provisioning platform for Eclipse-based applications), etc. When deployed on the cloud platform by the deploy service, e.g., via the separate custom deploy processor plugins, the content may be stored permanently in JPaaS repository of the platform.

Figure 2:
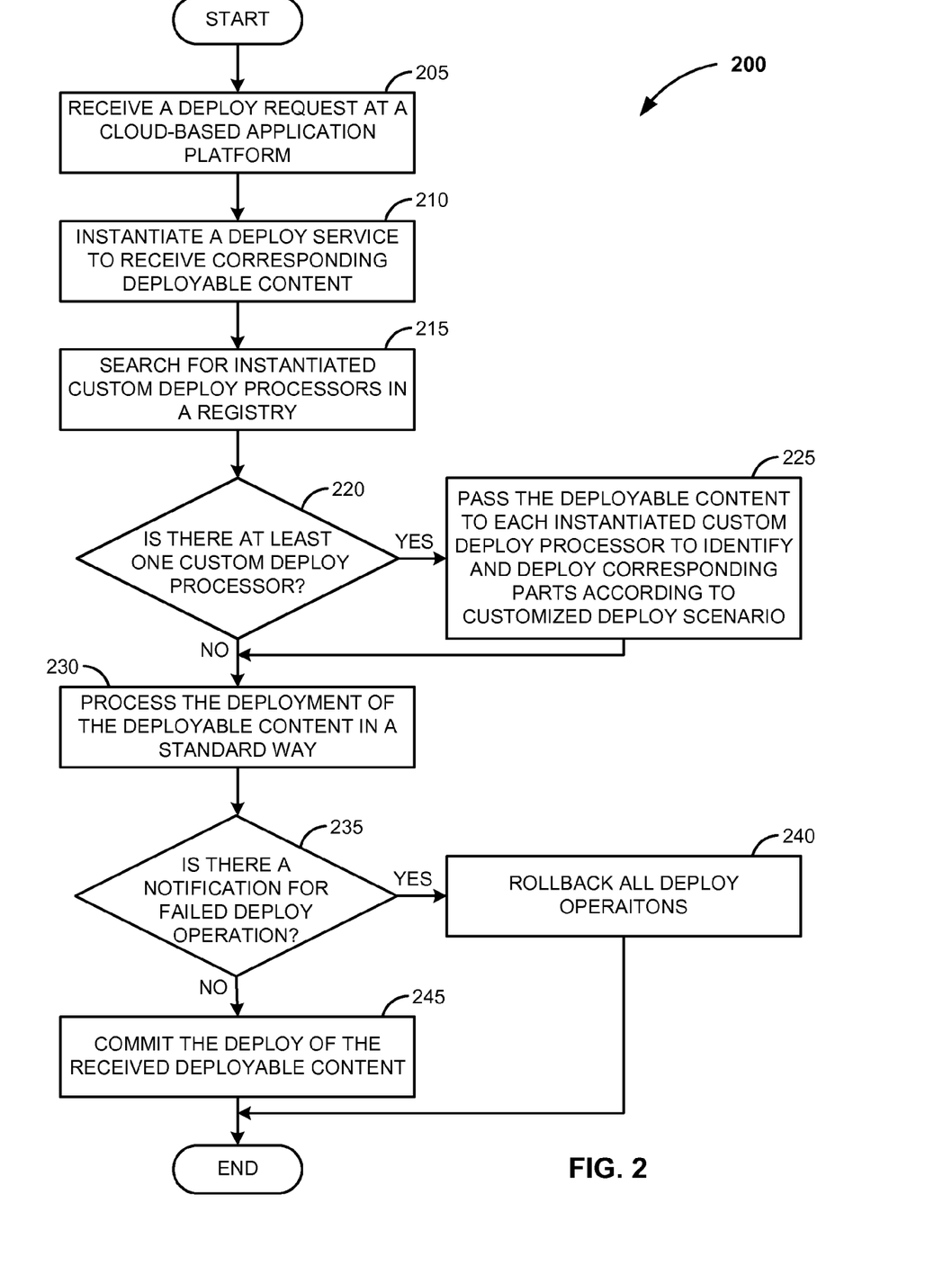
FIG. 2 is a flow diagram illustrating a process to execute customized deployment scenarios in a cloud-based application platform, according to one embodiment.

FIG. 2 shows process 200 to execute customized deployment scenarios in a cloud-based application platform, according to one embodiment. The operations of process 200 may be applied to other types of shared computer environments. Process 200 starts at 205 with receiving a deploy request from a client at the cloud-based application platform. For example, one of the clients of the cloud-based application platform providers may need to offer an additional service to its customers. Such service may be provided by a new or modified application on the cloud-based application platform. To do that, the client requests the deployment of the new or modified application. In one embodiment, the client provides deployable content together with the request, or/and a source of deployable content relevant to the deploy request.

At 210, a deploy service is instantiated at the cloud-based application platform to receive or access the deployable content. In one embodiment, the deploy service is part of the infrastructure of the cloud-based application platform provided by the vendor, and is based on the standard of the technology upon which the cloud-based application platform is built. For example, in a jPaaS based application platform, the deployment service is built according to the Java® Enterprise Edition (Java EE®) specification, and the OSGi standard. In one embodiment, the deploy service is enhanced to implement a contract defining rules as part of an API for plugging-in one or more custom deploy processors. The custom deploy processors may provide functionality for handling customized deployment scenarios, when such functionality is not provided by the general deploy service responsible for the regular deployment scenarios.

The deploy service may search for instantiated custom deploy processor plugins at 215. In one embodiment, the available custom deploy processors may be instantiated when the cloud-based application platform starts one or more corresponding application server environments. When started or instantiated, a custom deploy processor may register in a special registry accessible by the deploy service. The deploy service may look up the instantiate custom deploy process plugins in the registry to discover and call them according with the adopted contract API, and potentially, data or metadata provided by the custom deploy process at registration.

At 220, a check is performed to verify whether there is at least one custom deploy processor that is instantiated. In case there is the deployable content is passed to each of the instantiated custom deploy processors to identify and deploy their corresponding parts, if any, according to an applicable customized deployment scenario, at 225. Depending on factors such as the implementation, the registration information, the custom deploy processors setup, either all deployable content is passed to a custom deploy processor, or just its corresponding part for deployment.

Process 200 continues at 230 where the deployment of the deployable content, or what is not deployed yet, is processed in a way that is standard or regular for the cloud-based application platform. This deployment may be handled entirely according to the functionality the deploy service, and may be executed before or after the deployment according to the customized deployment scenario performed by the custom deploy processors.

At 235, a check is performed to verify whether the deployment of the deployable content according with the client request is successful. The check may periodically search for a notification for a failed deploy operation from any of the deploy service and/or the instantiated custom deploy processors. In case of such notification, all executed or currently executing deploy operations are rolled back, at 240. Alternatively, instead of verifying the successful deployment at 225, the deploy operations rollback may be triggered at 240 directly when an error occurs. If the execution of all deploy operations is successful, the deployment of the deployable content according with the client request is committed at 245.

A client requests a customized deployment scenario when the standard functionality of the deploy service as implemented and offered by the cloud-based application platform is not enough. For example, a client may request the cloud-based application platform to provide strong encryption for the Hypertext Transfer Protocol Secure (HTTPS) connections of one or more deployed applications and/or services when communicating with customers. The Java Development Kit (JDK) as an implementation of a Java EE based platform does not standardly support strong encryption HTTPS communication. Therefore, special policy files enabling such communication for an application need to be provided during deploy to the cloud-based application platform built upon Java EE (e.g., jPaaS). The deployment of such special policy files requires additional functionality, not provided by the general deploy service.

Figure 3:
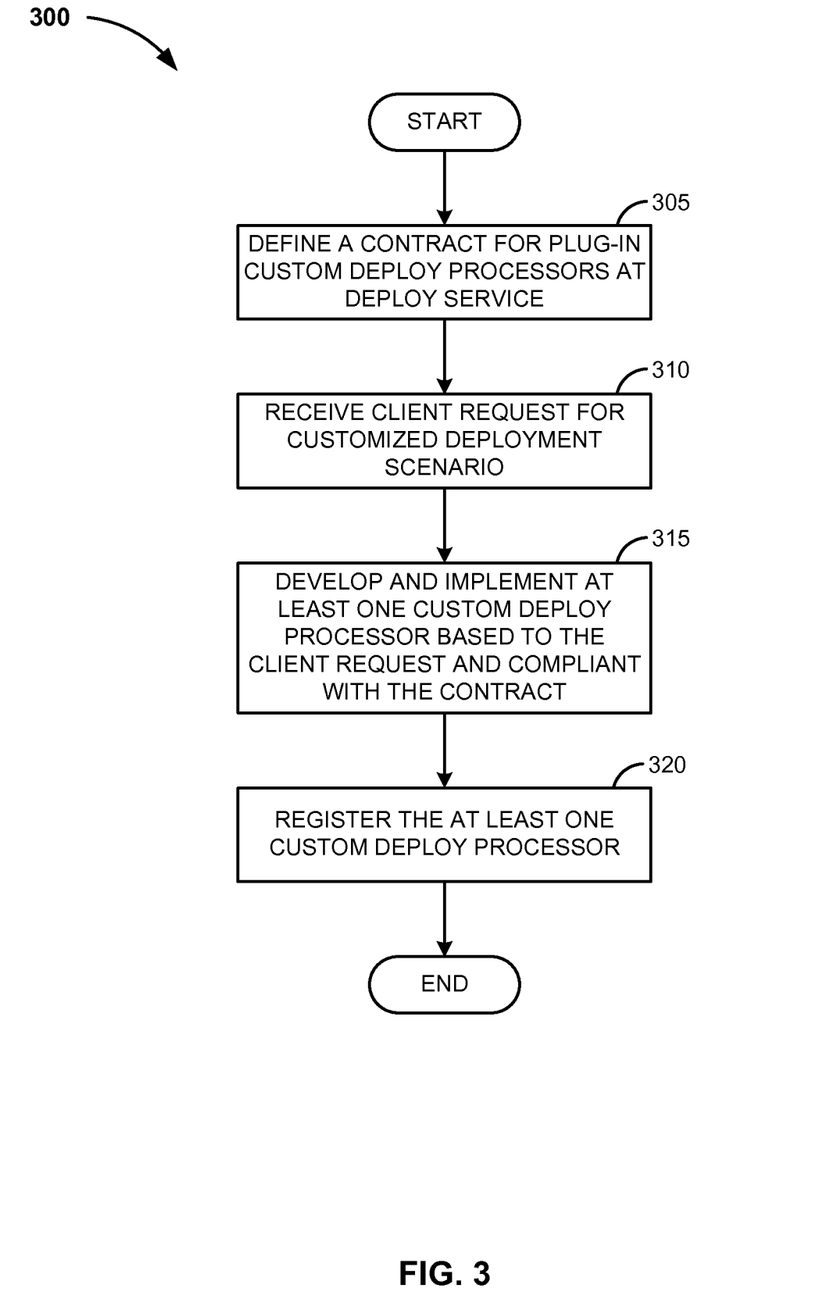
FIG. 3 is a flow diagram illustrating a process provisioning customized deployment scenarios in cloud-based computer environments according to one embodiment.

One possible way for provisioning customized deployment scenarios in a cloud-based, or otherwise shared, computer environments according to one embodiment is shown in FIG. 3 with process 300. Initially, at 305, a contract is defined at a deploy service of a cloud-based application platform for plugging-in custom deploy processors. The contract may specify an API to be implemented by the deploy service and the custom deploy processors, enabling method calls and execution of deploy operations by the custom deploy processors over deployable content accessed by the deploy service.

At 310, a client request for customized deployment scenario is received, specifying the type of content to be deployed and how. Alternatively, or in combination, the request may specify the characteristics of the service or application that needs to be deployed and provided to the customers of the client. Based on the request, one or more custom deploy processors are developed, compliant with the defined contract, at 315. The one or more custom deploy processors provide the functionality necessary for deploying content in a scenario based on the received client request. The developed one or more custom deploy processors are implemented in the cloud-based application platform as plugins of the deploy service, according to the contract.

The developed and implemented one or more custom deploy processors may be started or instantiated when the cloud-based application platform starts, or when an application server on the cloud-based application platform starts, or when the deploy service is instantiated. Regardless the triggering condition, when instantiated, a custom deploy processor registers with the cloud-based application platform or with the application server, or directly with the deploy service, at 320. The registration may be as simple as creating a corresponding record with identification data in a registry, where the registry may be a file or a table or some other data structure, accessible by the deploy service. In one embodiment, the registering custom deployment scenario may provide additional metadata, together with the identification data. The metadata may contain declaration or configuration information to filter the deployable content passed to the custom deploy processor plugin.

By following process 300, any number of developed custom deploy processors may be available for calling and utilizing by the deploy service. For example, the deploy service may not know how many custom deploy processors are created for a particular customized deployment scenario. The deploy service opens a service registry upon deployment request, reads or identifies the registered custom deploy processors, discovers them based on the register data, and passes the deployable content to all, one by one and/or in parallel. The customized deployment scenario may be executed as requested by the client when the one or more custom deploy processors recognize and deploy the specific content as required when called by the deploy service. The created custom deploy processors could be switched on and off, e.g., on demand.

In one embodiment, the role of a custom deploy processors may include finding data and/or metadata in the deployable content, and uploading this information to the cloud-based application platform. The information uploaded by the custom deploy processor may be accessible by different components of the cloud-based application platform, e.g., during runtime, and where components working over other services, e.g., documentation, widgets (application affecting another application) can find them. The custom deploy processor may provide not just deploy of specific information or application, but also additional functionality to run the specific application, or to run other applications in a specific way.

Figure 4:
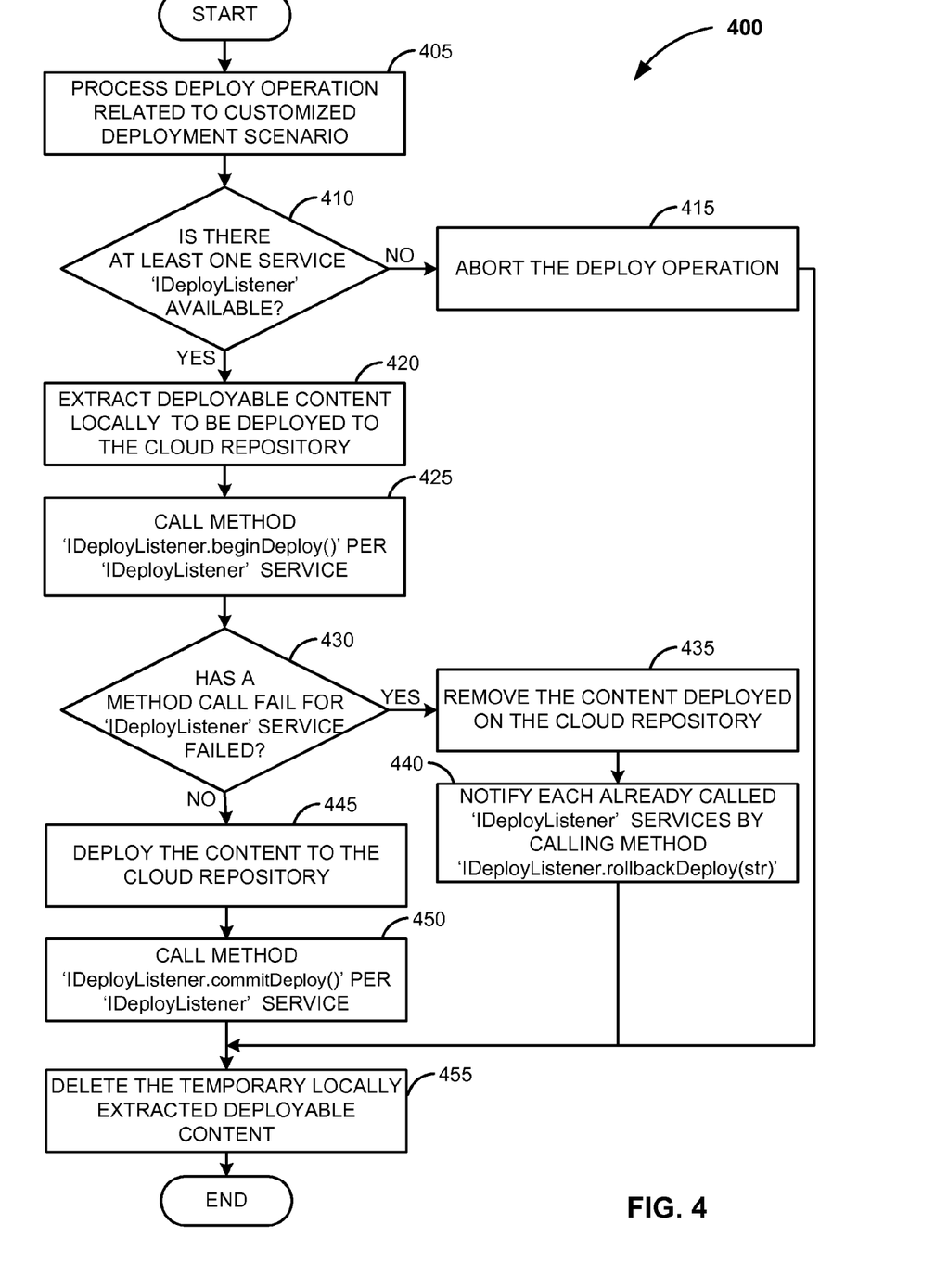
FIG. 4 is a flow diagram illustrating an implementation of a process providing customized deployment scenarios in cloud-based application platform, according to one embodiment.

FIG. 4 shows an example implementation of process 400 to providing customized deployment scenarios in cloud-based application platform, according to one embodiment. According to process 400, deployable content related to a customized deployment scenario for a Web application is accessed, at 405, e.g., by the deploy service of the cloud-based application platform, to process deploy operation. At 410, a check is performed to verify whether there is at least one 'IDeployListener' service available, e.g., instantiated. In one embodiment, the 'IDeployListener' services are provided by corresponding custom deploy processor plugins and implement a predefined API. When no 'IDeployListener' service is available, the deploy operation is aborted at 415.

At 420, deployable content is preprocessed or extracted, e.g., from an archive on a local update site, to be deployed to the repository of the cloud-based application platform (e.g., cloud repository). In one embodiment, the deploy service could be the one responsible for extracting and/or preprocessing the deployable content. Further, the deploy service may collect all available 'IDeployListener' services, and call method 'IDeployListener.beginDeploy( )' for each of them, simultaneously or in parallel, based on the predefined API. One or more Uniform Resource Identifiers (URIs) of Web application binaries to be deployed may be provided, e.g., pointing to the local update site.

At 430, a check is performed whether a method call for a 'IDeployListener' service has failed. If, for example, a method call fails with exception, the content deployed on the cloud repository will be removed (at 435) and the deployment will fail. All 'IDeployListener' services that were called until this moment will be notified that the deployment has failed by calling the method 'IDeployListener.rollbackDeploy(String)' passing an ID of the deploy operation as a 'String' data type, at 440.

When there are no failed method calls for the 'IDeployListener' services, the deployable content is deployed to the cloud repository, at 445. After successful deployment of the content to the repository, method 'IDeployListener.commitDeploy( )' of the predefined API is called for all instantiated 'IDeployListener' services to notify that the deploy operation was successful. The 'IDeployListener.commitDeploy( )' method requires finalization of the customized deployment scenario processing of the deployable content by the 'IDeployListener' services, and the changes done by the customized deployment are stored persistently. At 455, the temporarily locally extracted deployable content is deleted.

In one embodiment, if a 'IDeployListener.commitDeploy( )' method call fails with an exception, the deploy service may continue calling the 'IDeployListener.commitDeploy( )' method for the rest of the custom deploy processors. Afterwards, an undeployment may be performed of the deployed artifacts in order to clean up possible inconsistencies. Thus, a deployment failure may be simulated.

Figure 5:
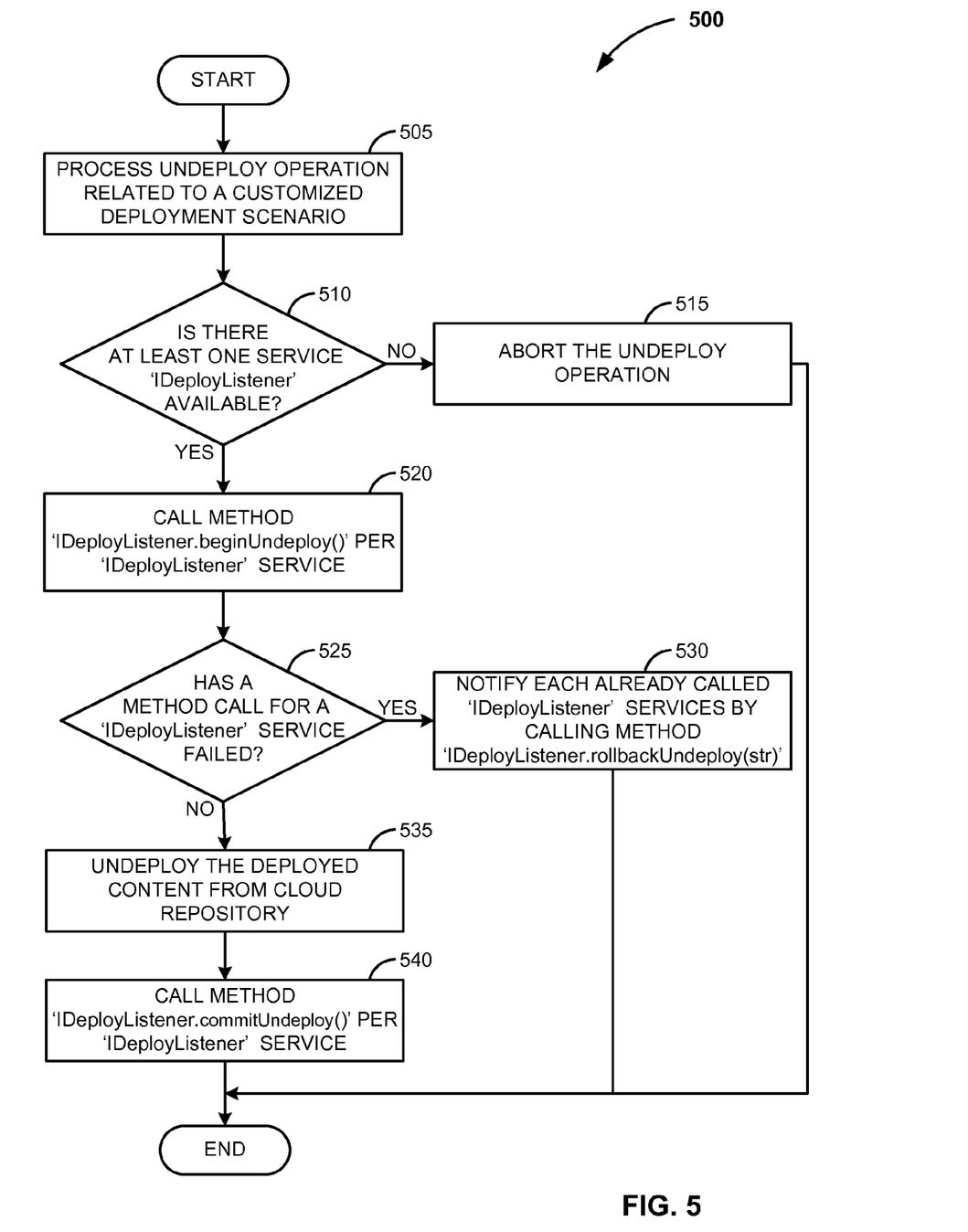
FIG. 5 is a flow diagram illustrating an implementation of a process providing undeploy operations related to customized deployment scenarios in cloud-based application platform, according to one embodiment.

FIG. 5 shows an example implementation of process 400 to provide undeploy operations related to customized deployment scenarios in cloud-based application platform, according to one embodiment. At 505, an undeploy operation, related to a customized deployment scenario, is processed by at a cloud-based application platform, e.g., by a deploy service. At 510, a check is performed to verify whether there is at least one 'IDeployListener' service available, e.g., instantiated. The 'IDeployListener' services correspond to custom deploy processor plugins implementing a predefined API. When no 'IDeployListener' service is available, the undeploy operation is aborted at 515.

At 520, all the available 'IDeployListener' services are discovered or collected, and the method 'IDeployListener.beginUndeploy( )' is called for each of them by the deploy service. A check is performed, at 525, to verify whether a method call for a 'IDeployListener' service has failed. In one embodiment, if any of the method calls fails with an exception, the undeploy operation will fail with error. All available 'IDeployListener' services that were called until this moment will be notified that the undeploy operation has failed by calling the method 'IDeployListener.rollbackUndeploy(String)' passing an ID of the undeploy operation.

When there are no failed method calls for the 'IDeployListener' services, content corresponding to the customized deployment scenario is undeployed from the repository of the cloud-based application platform, at 535. After successful undeployment of the content, method 'IDeployListener.commitUndeploy( )' of the predefined API is called for all instantiated 'IDeployListener' services to notify that the undeploy operation was successful. This requires finalization of the content processing by the services, and storing any changes persistently.

In one embodiment, the deploy service may crash during the execution of a deploy or undeploy operation. Therefore, the deploy service may persist a status of a currently executed operation or operations, to be able to rollback unfinished processing after a crash. In one embodiment, the processing of deploy and/or undeploy operations may have transactional behavior. For example, the data processed in method call 'IDeployListener.beginDeploy( )' makes no changes in the repository or any other store that are not revertible. The implementation waits for a call of any of the methods 'IDeployListener.commitDeploy( )' or 'IDeployListener.rollbackDeploy( )' in order to complete the operation. If the method 'IDeployListener.commitDeploy( )' or 'IDeployListener.rollbackDeploy( )' fails with exception, an error will be logged, but the deploy or undeploy operation may continue because at that point the operation cannot be undone.

In one embodiment, the implementation of a 'IDeployListener' service could be placed in a new component of the cloud-based application platform, e.g., a new OSGi bundle, and may be included in a deploy service feature. Table 1 illustrates an example source code definition of such 'IDeployListener' service:

TABLE 1

IDeployListener service definition

```
package com.sap.core.deploy.service;
import java.net.URI;
import java.util.List;
/**
 * Any service implementing this interface will participate in the deploy
 * operation of web applications. The service will be able to process the web
 * application binaries that are being deployed. It can extract useful
 * information such as configurations, annotations, etc. Accordingly, when web
 * applications are being undeployed, this service will be notified in order to
 * perform any cleanup if necessary.
 * <p>
 * The following conditions will cause the whole deploy/undeploy operation to
 * fail:
 * <li>There is no service implementing this interface
 * <li>If methods <code>beginDeploy<code> or <code>beginUndeploy<code> throw an exception
 *
 * @author I075991
 *
 */
```

TABLE 1-continued

IDeployListener service definition

```
public interface IDeployListener {
    /**
     * This method is called by the deploy service during a deploy operation. It
     * provided URIs for each web application binary which is being deployed.
     * The deploy operation may fail at later stage, so the implementer of this
     * method must not do any operations that cannot be reverted.
     *
     * @param account
     * name of account; cannot be <code>null</code>
     * @param application
     * name of application; cannot be <code>null</code>
     * @param component
     * name of component; cannot be <code>null</code>
     * @param apps
     * the list of the URIs to all web application binaries that are
     * being deployed
     * @param operationID
     * the ID of the current deploy operation. It is used later to
     * perform commit or rollback.
     * @see #rollbackDeploy(String)
     * @see #commitDeploy(String)
     */
    void beginDeploy(String account, String application,
            String component, List<URI> apps, String operationID);
    /**
     * Deploy service will call this method when the deploy operation cannot
     * complete successfully and all changes need to be reverted.
     *
     * @param operationID
     * the ID of the deploy operation which has failed
     */
    void rollbackDeploy(String operationID);
    /**
     * Deploy service will call this method when the deploy operation has
     * completed successfully and all changes need to be committed. This method
     * must not fail with exception because the deploy operation cannot be
     * reverted at this point
     *
     * @param operationID
     * the ID of the deploy operation which has succeeded
     */
    void commitDeploy(String operationID);
    /**
     * This method is called by the deploy service during an undeploy operation.
     * It provides information for account/application/component in order to
     * identify the component being undeployed. The undeploy operation may fail
     * at later stage,so the Implementer of this method must not do any
     * operations that cannot be reverted.
     *
     * @param account
     * name of account; cannot be <code>null</code>
     * @param application
     * name of application; cannot be <code>null</code>
     * @param component
     * name of component; cannot be <code>null</code>
     * @param operationID
     * the ID of the current undeploy operation. It is used later to
     * perform commit or rollback.
     *
     * @see #rollbackUndeploy(String)
     * @see #commitUndeploy(String)
     */
    void beginUndeploy(String account, String application,
            String component, String operationID);
    /**
     * Deploy service will call this method when the undeploy operation cannot
     * complete successfully and all changes need to be reverted.
     *
     * @param operationID
     * the ID of the undeploy operation which has failed
     */
    void rollbackUndeploy(String operationID);
    /**
     * Deploy service will call this method when the undeploy operation has
     * completed successfully and all changes need to be committed. This method
```

TABLE 1-continued

IDeployListener service definition

```
 * must not fail with exception because the undeploy operation cannot be
 * reverted at this point
 *
 * @param operationID
 * the ID of the undeploy operation which has succeeded
 */
void commitUndeploy(String operationID);
```

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
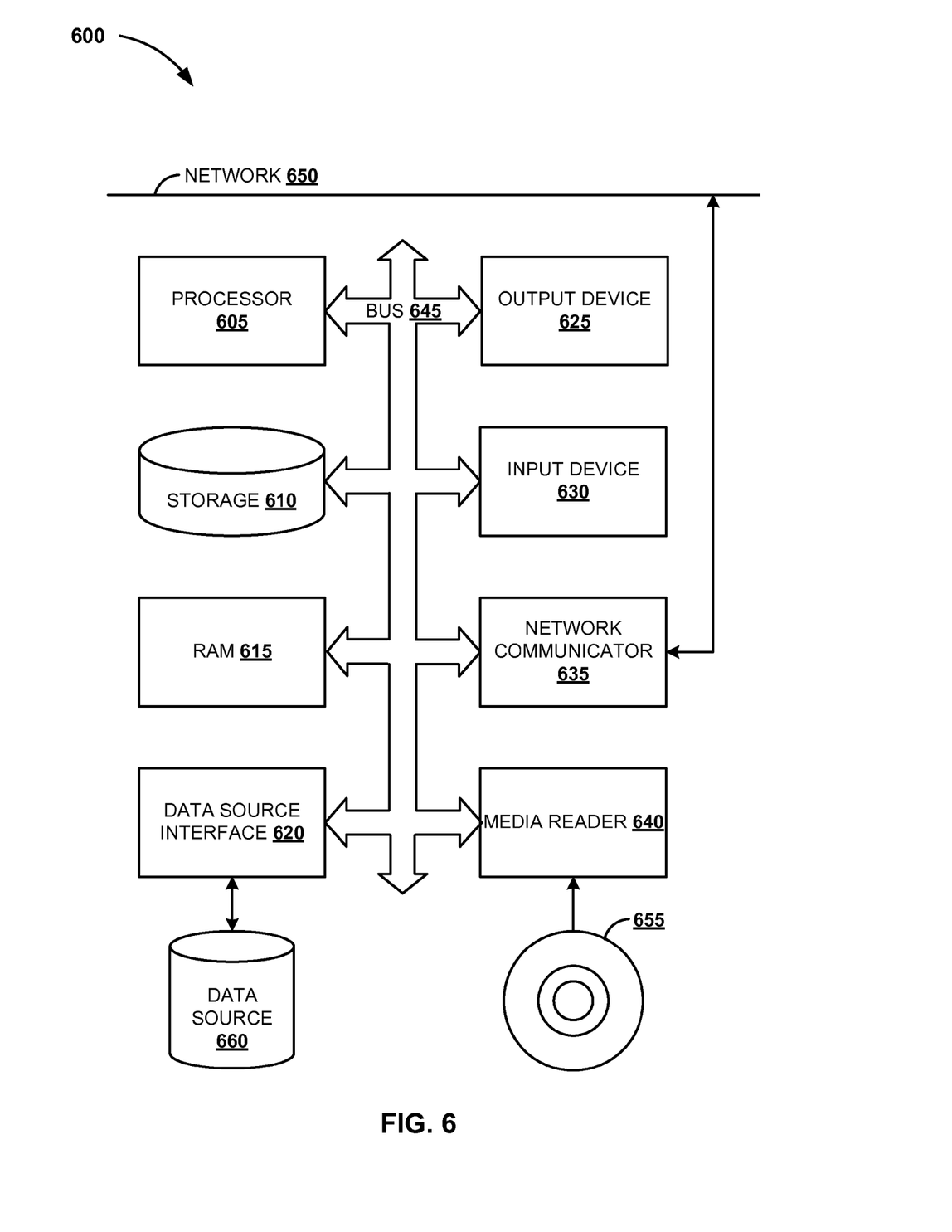
FIG. 6 is a block diagram of an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system that processes customized deploy scenarios, the system comprising:
   a memory that stores computer executable instructions;
   at least one computer processor coupled to the memory that executes the instructions to receive a deploy request from a client of a plurality of clients of a cloud-based application platform, wherein the client is associated with a customized deploy scenario;
   a deploy service that accesses deployable content associated with the deploy request; and
   one or more custom deploy processors identifiable upon an instantiation of the deploy service, wherein at least one custom deploy processor of the one or more custom deploy processors provides a functionality for handling the customized deploy scenario when the functionality for handling the customized deploy scenario is not provided by the deploy service, wherein the at least one custom deploy processor of the one or more custom deploy processors corresponds to the customized deploy scenario, and wherein the at least one custom deploy processor of the one or more custom deploy processors recognizes and deploys a corresponding part of the deployable content according to the customized deploy scenario associated with the client.

2. The system of claim 1 further comprising:
   a registry that stores information for the one or more custom deploy processors, wherein the one or more custom deploy processors are discoverable based on the information stored in the registry.

3. The system of claim 1, wherein the at least one custom deploy processor further generates a deploy error notification in response to a failure of the deployment of the corresponding part of the deployable content.

4. The system of claim 1, wherein the at least one custom deploy processor further rollbacks the deployment of the corresponding part of the deployable content in response to a deploy error notification associated with the deployable content.

5. The system of claim 1, wherein the deploy service further:
   preprocesses the deployable content to extract the corresponding part of the deployable content based on a metadata associated with the at least one custom deploy processor; and
   passes the corresponding part of the deployable content to the at least one custom deploy processor for deployment.

6. The system of claim 1, wherein the deploy service further:
   passes the deployable content associated with the deploy request to the one or more custom deploy processors.

7. A non-transitory computer-readable storage medium comprising instructions that, when executed by at least one processor of a machine, cause the machine to perform operations comprising:
   receive a deploy request from a client of a plurality of clients of a cloud-based application platform, wherein the client is associated with a customized deploy scenario;
   in response to the deploy request, instantiate a deploy service of the cloud-based application platform to access deployable content associated with the deploy request;
   upon the instantiation of the deploy service, identify one or more custom deploy processors, wherein at least one custom deploy processor of the one or more custom deploy processors corresponds to the customized deploy scenario, and wherein the at least one custom deploy processor of the one or more custom deploy processors provides a functionality for handling the customized deploy scenario when the functionality for handling the customized deploy scenario is not provided by the deploy service;
   recognize a part of the deployable content that corresponds to the at least one custom deploy processor of the one or more custom deploy processors; and
   deploy the corresponding part of the deployable content by the least one custom deploy processor of the one or more custom deploy processors, wherein the corresponding part of the deployable content corresponds to the customized deploy scenario associated with the client.

8. The non-transitory computer-readable storage medium of claim 7 comprising instructions that, when executed by the at least one processor of the machine, cause the machine to perform operations further comprising:
   generate a deploy error notification by the at least one custom deploy processor when the deployment of the corresponding part of the deployable content fails.

9. The non-transitory computer-readable storage medium of claim 7 comprising instructions that, when executed by the at least one processor of the machine, cause the machine to perform operations further comprising:
   rollback the deployment of the corresponding part of the deployable content by the at least one custom deploy processor in response to a deploy error notification associated with the deployable content.

10. The non-transitory computer-readable storage medium of claim 7, wherein identifying the one or more custom deploy processors comprises:
    discover the one or more custom deploy processors by the deploy service based on a registry, wherein the registry stores information for the one or more custom deploy processors.

11. The non-transitory computer-readable storage medium of claim 10, wherein deploying the corresponding part of the deployable content comprises:
    preprocess the deployable content by the deploy service to extract the corresponding part of the deployable content based on information stored in the registry for the at least one custom deploy processor; and
    pass the corresponding part of the deployable content to the at least one custom deploy processor for deployment.

12. The non-transitory computer-readable storage medium of claim 7, wherein recognizing the corresponding part of the deployable content comprises:
  pass the deployable content associated with the deploy request to the one or more custom deploy processors; and
  search the deployable content by the at least one custom deploy processor for the corresponding part of the deployable content.

13. The non-transitory computer-readable storage medium of claim 7, wherein deploying the corresponding part of the deployable content comprises:
  store the corresponding part of the deployable content in a repository associated with the at least one custom deploy processor to be available for a runtime of the cloud-based application platform.

14. A computer implemented method to process customized deployment scenarios, the method comprising:
  at a cloud-based application platform, receiving a deploy request from a client of a plurality of clients of the cloud-based application platform, wherein the client is associated with a customized deploy scenario;
  instantiating, by at least one computer processor, a deploy service of the cloud-based application platform to access deployable content associated with the deploy request;
  in response to the deployment request, identifying, by the deploy service, one or more custom deploy processors, wherein at least one custom deploy processor of the one or more custom deploy processors corresponds to the customized deploy scenario, and wherein the at least one custom deploy processor of one or more custom deploy processors provides a functionality for handling the customized deploy scenario when the functionality for handling the customized deploy scenario is not provided by the deploy service;
  recognizing a part of the deployable content that corresponds to the at least one custom deploy processor of the one or more custom deploy processors; and
  deploying the corresponding part of the deployable content by the at least one custom deploy processor of the one or more custom deploy processors, wherein the corresponding part of the deployable content corresponds to the customized deploy scenario associated with the client.

15. The method of claim 14 further comprising:
  generating a deploy error notification by the at least one custom deploy processor when the deployment of the corresponding part of the deployable content fails.

16. The method of claim 14 further comprising:
  rolling back the deployment of the corresponding part of the deployable content by the at least one custom deploy processor in response to a deploy error notification associated with the deployable content.

17. The method of claim 14, wherein identifying the one or more custom deploy processors comprises:
  discovering the one or more custom deploy processors by the deploy service based on a registry, wherein the registry stores information for the one or more custom deploy processors.

18. The method of claim 17, wherein deploying the corresponding part of the deployable content comprises:
  preprocessing the deployable content by the deploy service to extract the corresponding part of the deployable content based on information stored in the registry for the at least one custom deploy processor; and
  passing the corresponding part of the deployable content to the at least one custom deploy processor for deployment.

19. The method of claim 14, wherein recognizing the corresponding part of the deployable content comprises:
  passing the deployable content associated with the deploy request to the one or more custom deploy processors; and
  searching the deployable content by the at least one custom deploy processor for the corresponding part of the deployable content.

20. The method of claim 14, wherein deploying the corresponding part of the deployable content comprises:
  persisting the corresponding part of the deployable content in a repository of the cloud-based application platform to be available at a runtime.

21. The system of claim 1, wherein the at least one custom deploy processor further:
  searches the deployable content for the corresponding part of the deployable content.

* * * * *